United States Patent Office 3,520,822
Patented July 21, 1970

---

3,520,822
FOAM DESTRUCTION DEVICE
Knut Rude Traelnes, Yverdon, Switzerland, assignor to Societe d'assistance technique pour produits Nestle S.A., Lausanne, Switzerland, a corporation of Switzerland
Filed Apr. 15, 1968, Ser. No. 721,230
Claims priority, application Switzerland, Apr. 13, 1967, 5,230/67
Int. Cl. B01d *19/02*
U.S. Cl. 252—361                                      5 Claims

ABSTRACT OF THE DISCLOSURE

A foam destruction device comprises an open-ended chamber, preferably conical, with an interior wall flared upwardly and outwardly, a cylindrical base and an impeller within or below the base. The liquid level outside the chamber is raised and the surface foam overflows into the chamber where it is broken up by the vortex caused by the impeller and is returned to the liquid. Other features of the invention are described in the following specification and accompanying drawing.

---

This invention relates to the fermentation or culture of aerobic microorganisms on liquid or semi-liquid substrates and, more particularly, is concerned with a device for destroying foam produced during a fermentation.

Aerobic fermentations are generally effected in vessels having means for supplying air to the reaction medium and for mechanical agitation of the latter. The feed to the vessels is usually adjusted to give head space which corresponds to about 30% of the available volume.

Fermentation carried out under the conditions described above causes, in most cases, the formation of foam, the quantity and characteristics of which depend on a number of factors, notably the type of microorganism, the composition of the reaction medium, the intensity of agitation, etc.

The uncontrolled accumulation of foam inside a fermentation vessel generally has a deleterious effect on the yield of the operation. Thus, when the production of foam exceeds a certain limit, the volume which it occupies rapidly exceeds the head space and the excess escapes through the air exhaust and is lost. The loss is especially serious when, as with the majority of fermentation media, the foam is rich in cellular material. Similar difficulties arise in other types of chemical or physical reaction generating foam in large quantities.

Mechanical means have been used in order to reduce the foam produced, but these are usually insufficient when the production of foam is considerable. For the same purpose chemical agents can be employed, particularly surface-active agents such as silicones. This method, which is effective in most cases, is nevertheless expensive and appreciably increases the cost of the operation.

It is an object of the invention to provide a device to control the level of foam in a vessel containing a foaming liquid, especially a fermentation broth, which is efficient even with large amounts of foam and also relatively simple and inexpensive.

According to the invention, there is provided a foam destruction device comprising a chamber having an upper opening, a lower opening, an upwardly and outwardly flared interior wall and a base, and a rotatable impeller disposed within or below the base of the chamber.

Preferably, the chamber is cylindrical and the device is mounted inside a fermenter with the base below the surface of the fermentation liquid. The impeller is desirably of the manive propeller type of which the direction of rotation and blade pitch are arranged to generate downwardly-directed vertical flow.

Figure 1:
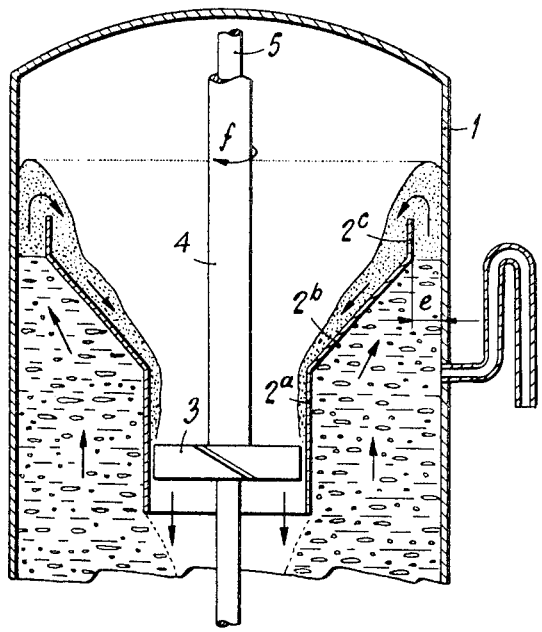
Figure 2:
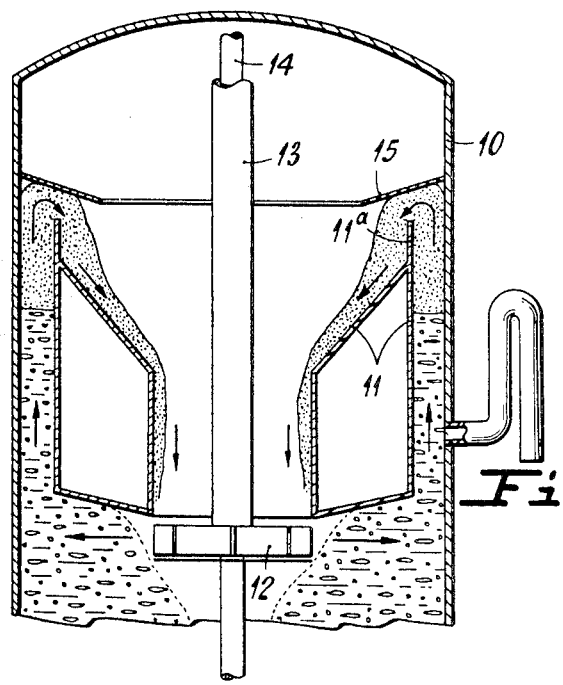

By way of example, two embodiments of the invention, as applied to a fermenter are shown schematically in the accompanying drawing in which:

FIG. 1 is a longitudinal section of a device according to the first embodiment, and FIG. 2 is a variant shown in the same way.

As shown in FIG. 1, the device is mounted in the upper part of the fermentation vessel 1. It consists of a funnel comprising a cylindrical base 2a, a frustoconical body 2b flaring upwards and a cylindrical part 2c above the body. The funnel and the fermenter wall are coaxial and the distance $e$ which separates part 2c from said wall is from 0.10 to 0.15 times the interior diameter of the fermenter.

The device also comprises a propeller 3 positioned inside the cylindrical base 2a of the funnel. This propeller is rotated in the direction indicated by the arrow $f$ by a tubular shaft 4, and the blades are oriented so as to cause downwardly-directed flow. The shaft 4 is, in the embodiment shown, independent of the shaft 5 of the stirrer (not shown) of the vessel 1. Alternatively, the propeller may be mounted on the shaft 5.

In operation, the level of the fermentation medium is controlled in such a manner that the base of the funnel is immersed in the liquid. Rotation of the propeller 3 causes a vortex inside the bottom of the cylindrical base 2a which displaces the mass of liquid around the funnel and raises the liquid level up to around the base of the cylindrical part 2c. Preferably, the constant automatic control of the level of the liquid is assured by a siphon or other convenient device.

The arrangement described above allows the surface of the medium to be considerably reduced and the formation of foam takes place only at the annular surface between the wall of the fermenter and the upper part of the funnel. When the foam formed in the narrow space rises above a certain height, which is dependent on its mechanical rigidity, it runs over into the funnel and flows down the sloping wall to the point at which, drawn by the vortex, it is returned to the fermentation medium.

In the embodiment shown in FIG. 2, the funnel is replaced by an annular drum 11 having a cylindrical outer wall, extended at 11a, and on the inside the same arrangement as described with reference to FIG. 1. The shape of this chamber provides an annular duct of reduced volume around the drum 11, which is, for example, suited to an impeller capable of displacing only a small mass of liquid.

In the embodiment shown in FIG. 2, the propeller is replaced by a lifter turbine 12, mounted just below the base of the drum 11. This turbine is driven by a tubular shaft 13, coaxial with the shaft 14 of a stirrer (not shown) for the vessel 10. It produces essentially the same effects as the propeller, i.e. the displacement of the upper layer of the medium around the drum and turbulence at its base.

Finally, the apparatus comprises one or more deflectors 15 located to direct the flow of foam towards the interior of the funnel or drum.

I claim:

1. In liquid fermentation apparatus including a vertically disposed vessel in which the liquid is received, said vessel having an encircling wall, a foam destruction device within said vessel for destroying foam produced during fermentation, said device comprising a vertically axised funnel-like body having openings at the top and bottom thereof, said body being suspended in said vessel with said bottom opening immersed in said liquid above the vessel bottom and the upper opening above the liquid level, said body further having a cylindrical lower base, a frusto-conical part diverging upwardly and radially outwardly from the upper part of said base, and an upper cylindrical part, said upper cylindrical part being concentrically spaced from the encircling wall of said vessel at a distance of 0.10 to 0.15 times the internal diameter of said encircling wall and therewith defining an annular space within said vessel, said upper cylindrical part having a rim defining said top opening, fluid impelling means disposed across the opening at the bottom of said body, and operable to displace the liquid upwardly around the outside of said device and into said annular space, thereby to create a vortex within the cylindrical base of said funnel-like body, and level control means associated with said vessel for maintaining the surface level of liquid therein a distance below the rim of said upper cylindrical part whereby only foam produced at the surface of said liquid can flow over the rim of said upper cylindrical part and downwardly within said funnel-like body to said vortex.

2. The apparatus of claim 1 wherein the cylindrical base and frusto-conical part of said funnel-like body are concentric with the upper cylindrical part of said body.

3. The apparatus of claim 1 wherein said funnel-like body is provided with a cylindrical drum-like extension extending vertically downwardly from the upper cylindrical part of said body.

4. The apparatus of claim 3 further comprising a plate-like deflector extending across the interior of said vessel and spaced a distance above the rim of the upper cylindrical part of said funnel-like body.

5. A process for destroying foam produced at the surface of a liquid during fermentation of the latter which comprises displacing the liquid from a body thereof upwardly in the form of a liquid annulus thereby to constrict the surface area at which foam liberation can occur, while simultaneously establishing a vortex at the bottom of the space encircled by said annulus, and maintaining the surface level of said liquid annulus a distance below the annular rim of an overflow barrier separating the liquid annulus from the vortex whereby only liberated foam may overflow such barrier and flow downwardly to said vortex.

References Cited

UNITED STATES PATENTS

| | | | |
|---|---|---|---|
| 2,703,304 | 3/1955 | Paladino | 195—107 |
| 1,067,336 | 7/1913 | Hay. | |
| 1,454,610 | 5/1923 | Wolf | 68—137 |
| 3,056,831 | 10/1962 | Stratford | 261—141 |
| 3,189,080 | 6/1965 | Overcashier et al. | |
| 3,306,710 | 2/1967 | Messing | 159—45 X |

FOREIGN PATENTS 1,172,408   2/1959   France.

NORMAN YUDKOFF, Primary Examiner

J. SOFER, Assistant Examiner

U.S. Cl. X.R.
55—178; 195—107